(12) United States Patent
Banzhaf et al.

(10) Patent No.: US 9,400,689 B2
(45) Date of Patent: *Jul. 26, 2016

(54) RESOURCE ALLOCATION/DE-ALLOCATION AND ACTIVATION/DEACTIVATION

(71) Applicant: International Business Machines Corporation, Armonk, NY (US)

(72) Inventors: Gerhard Banzhaf, Nufringen (DE); James M. Jenks, Vestal, NY (US); Angel Nunez Mencias, Stuttgart (DE); Eric A. Weinmann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,546

(22) Filed: Oct. 23, 2014

(65) Prior Publication Data

US 2016/0072719 A1 Mar. 10, 2016

Related U.S. Application Data

(63) Continuation of application No. 14/479,430, filed on Sep. 8, 2014.

(51) Int. Cl.
*G06F 9/455* (2006.01)
*G06F 9/50* (2006.01)
*H04L 12/911* (2013.01)

(52) U.S. Cl.
CPC .......... *G06F 9/5005* (2013.01); *G06F 9/45558* (2013.01); *G06F 9/50* (2013.01); *H04L 47/70* (2013.01); *H04L 47/781* (2013.01); *G06F 2009/45579* (2013.01); *G06F 2009/45583* (2013.01)

(58) Field of Classification Search
CPC .......................................... G06F 9/455–9/5094
See application file for complete search history.

(56) References Cited

U.S. PATENT DOCUMENTS

| 8,365,182 | B2 | 1/2013 | Groetzner et al. |
| 8,429,276 | B1 | 4/2013 | Kumar et al. |
| 8,468,535 | B1 | 6/2013 | Keagy et al. |

(Continued)

FOREIGN PATENT DOCUMENTS

| CN | 103309745 A | 9/2013 |
| JP | 5284809 B2 | 9/2013 |

OTHER PUBLICATIONS

Nguyen Van, Hien, et al., "Autonomic virtual resource management for service hosting platforms", 2009, pp. 1-8.*

(Continued)

*Primary Examiner* — Thuy Dao
*Assistant Examiner* — Christopher Franco
(74) *Attorney, Agent, or Firm* — John W. Hayes; William H. Hartwell (57) ABSTRACT

A computer-implemented method, carried out by one or more processors, for managing resources in a server environment. In an embodiment, the method includes determining to prepare one or more virtual resources for activation of one or more allocated host resources, based, at least in part, on virtual resource definitions. The one or more allocated host resources and the one or more virtual resources are activated. Activation of the one or more virtual resources is finalized, wherein finalizing the activation includes updating the virtual resource definitions.

4 Claims, 5 Drawing Sheets

(56) References Cited

U.S. PATENT DOCUMENTS

| | | | |
|---|---|---|---|
| RE44,686 E | 12/2013 | Keshav et al. | |
| 2005/0039183 A1* | 2/2005 | Romero | G06F 9/5061 718/100 |
| 2007/0028244 A1* | 2/2007 | Landis | G06F 9/5016 718/108 |
| 2008/0123559 A1* | 5/2008 | Haviv | G06F 8/61 370/255 |
| 2009/0307308 A1* | 12/2009 | Siegemund | G06F 9/45504 709/203 |
| 2010/0293544 A1 | 11/2010 | Wilson et al. | |
| 2011/0022812 A1* | 1/2011 | van der Linden | G06F 9/5077 711/163 |
| 2012/0110164 A1* | 5/2012 | Frey | G06F 9/5077 709/224 |
| 2012/0204187 A1* | 8/2012 | Breiter | G06F 9/5072 718/105 |
| 2013/0031559 A1 | 1/2013 | Alicherry | |
| 2013/0198386 A1* | 8/2013 | Srikanth | G06F 9/5061 709/226 |
| 2013/0198743 A1* | 8/2013 | Kruglick | G06F 9/45533 718/1 |
| 2013/0263117 A1 | 10/2013 | Konik et al. | |
| 2013/0318134 A1* | 11/2013 | Bolik | G06F 9/5011 707/827 |
| 2014/0007097 A1 | 1/2014 | Chin et al. | |
| 2014/0032761 A1 | 1/2014 | Beveridge | |
| 2014/0282525 A1* | 9/2014 | Sapuram | G06Q 30/0631 718/1 |
| 2014/0365662 A1* | 12/2014 | Dave | G06F 9/45533 709/226 |
| 2015/0113144 A1* | 4/2015 | Bauer | G06F 9/5072 709/226 |
| 2015/0163157 A1* | 6/2015 | Hao | G06F 9/5072 709/226 |

OTHER PUBLICATIONS

Soundararajan, Gokul, et al., "Dynamic Resource Allocation for Database Servers Running on Virtual Storage", 2009, pp. 71-84.*

Endo, Patricia Takako, et al., "Resource Allocation for Distributed Cloud: Concepts and Research Challenges", 2011, pp. 42-46.*

Papagianni, Chrysa, et al., "On the Optimal Allocation of Virtual Resources in Cloud Computing Networks", 2013, pp. 1060-1071.*

Lu, Lei, et al., "Application-Driven Dynamic Vertical Scaling of Virtual Machines in Resource Pools", May 2014, pp. 1-9.*

Akhani, Janki, et al., "Negotiation for Resource Allocation in IaaS Cloud", 2011, pp. 1-7.*

Amann, S. et al. U.S. Appl. No. 14/521,516, filed Oct. 23, 2014.

Banzhaf, G. et al. U.S. Appl. No. 14/479,430, filed Sep. 8, 2014.

Dutta, S et al. "Service Deactivation Aware Placement and Defragmentation in Enterprise Clouds". 7th International Conference on Network and Service Management (CNSM). Publication Year: 2011. pp. 1-9.

Xiao et al. "Dynamic Resource Allocation Using Virtual Machines for Cloud Computing Environment". IEEE Transactions on Parallel and Distributed Systems, vol. 24, No. 6, Jun. 2013. pp. 1107-1117. Copyright IEEE 2013.

"System and method of resource/service provisioning and de-provisioning based on usage patterns in a cloud environment". IP.com No. IPCOM000230775D. IP.com Electronic Publication: Sep. 11, 2013.

"VMware Distributed Resource Scheduler (DRS) Dynamic Load Balancing and Resource Allocation for Virtual Machines". Product Datasheet 1. Copyright 2009 VMware, Inc. Palo Alto, CA.

Appendix P List of IBM Patents or Patent Applications Treated as Related.

Amann, S. et al. U.S. Appl. No. 14/479,562, filed Sep. 8, 2014.

* cited by examiner

RESOURCE ALLOCATION/DE-ALLOCATION AND ACTIVATION/DEACTIVATION

BACKGROUND

In a virtual server environment, resources are typically allocated for utilization by virtual servers and other resource consumers. In a cloud environment, where a large number of virtual servers competing for and sharing common resources is deployed, the frequency of resource allocations and de-allocations is by an order of magnitude higher than in traditional server environments. Additional focus is put on input and output resources, where multiple and often time-consuming actions may be needed to prepare a resource for use by a virtual server. It is desirable that the resource activations and corresponding deactivations be performed in an automated and synchronized manner.

SUMMARY

Embodiments of the present invention disclose a method, computer program product and computer system for managing resources in a server environment. A computer-implemented method includes determining, by one or more processors, to prepare one or more virtual resources for activation of one or more allocated host resources, based, at least in part, on virtual resource definitions. The allocated host resources and the one or more virtual resources are activated. Activation of the one or more virtual resources is finalized, wherein finalizing the activation includes updating the virtual resource definitions.

DETAILED DESCRIPTION

Embodiments in accordance with the present invention manage resource allocations and activations, as well as de-allocations and deactivations. Virtual resources exist as part of a resource consumer. A Resource consumer may be a virtual server, for example, a hypervisor. Although a hypervisor is generally a resource consumer that provides virtual resources to its guests, a hypervisor may also consume resources for its own, internal purposes. Appropriate host resources are assigned to these virtual resources when the resource consumer is activated. Resource allocation pertains to assigning host resources to virtual resources, such that a resource consumer can utilize the virtual resources. Embodiments in accordance with the present invention provide different types of host resources on multiple levels (i.e., physical server and hypervisors) that are assigned to resource consumers deployed on multiple levels of a server or within a server cluster. The number of available host resources is typically limited due to equipment constraints, and even when the host resources are virtualized resources based on physical resources. For instance, an upper limit exists for the number of virtual adapters hosted by a single physical adapter.

Resource allocation is typically performed on demand when resources are needed to activate a resource consumer or when additional resources are called for an active resource consumer. Correspondingly, resource de-allocation is typically performed when the resource consumer is deactivated. Therefore, on subsequent resource consumer activations, different host resources can be allocated to the virtual resources. Also, the same host resource can be allocated to different virtual resources of the same or different resource consumers at different points in time.

In order to utilize a virtual resource, a resource activation is typically performed. Resource activation actions can include clearing main memory before assignment to a resource consumer, and updating network configuration and storage access to tables in host firmware (i.e., physical server and/or hypervisors). The activation procedure can depend on a virtualization type, where the virtualization type is how the host resource is virtualized so that, for instance, a single physical host resource represents multiple virtualized host resources. The activation procedure can also depend on where the resource consumer is deployed, more particularly, on which hypervisor level. Activation of both the virtual resource and the assigned host resource allows for resource utilization by server firmware, hypervisors, and privileged operating systems.

Figure 1:
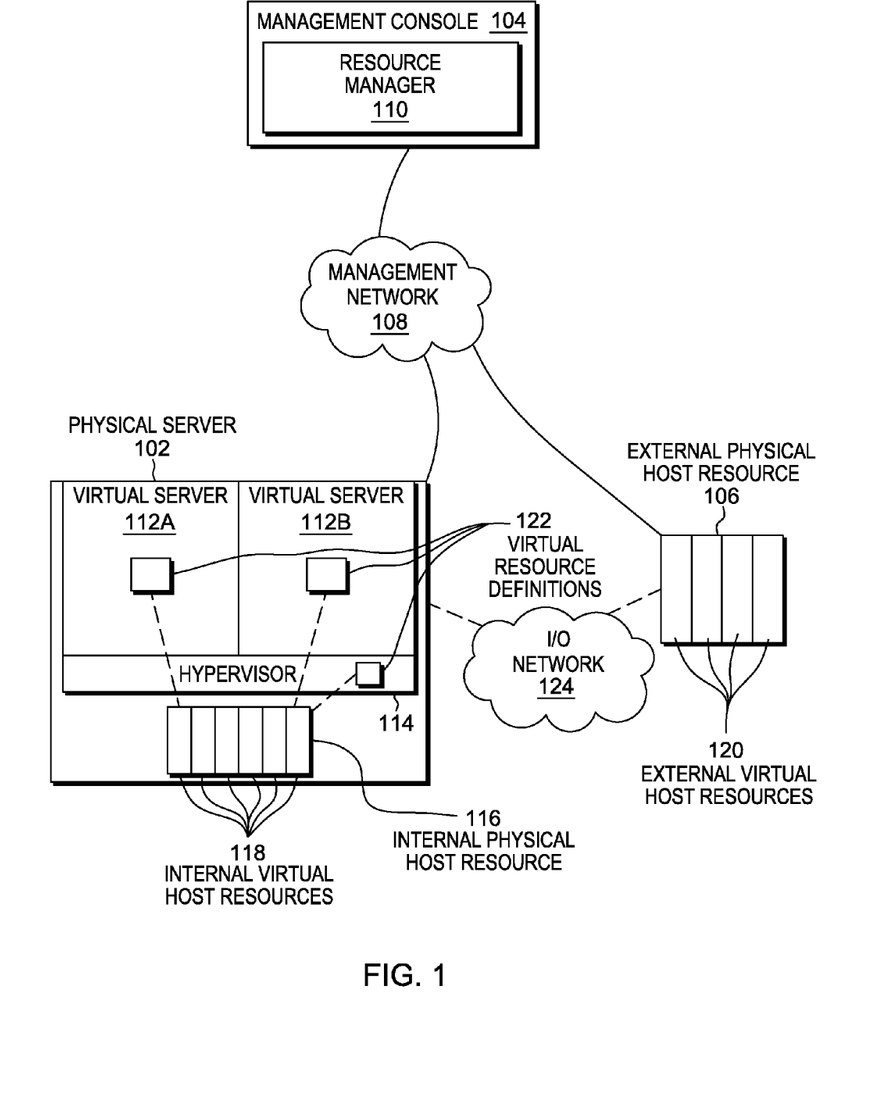
FIG. 1 is a functional block diagram illustrating a distributed data processing environment, in accordance with an embodiment of the present invention.

Example embodiments in accordance with the present invention will now be described in detail with reference to the drawing figures. FIG. 1 is a functional block diagram illustrating a distributed data processing environment, in accordance with one embodiment of the present invention. The distributed data processing environment includes physical server 102, management console 104, and external physical host resource 106, all interconnected over management network 108.

Physical server 102 represents a computer system utilizing clustered computers and components that act as a single pool of seamless resources when accessed through I/O network 124, as is common in data centers and with cloud computing applications. In general, physical server 102 is representative of any programmable electronic device or combination of programmable electronic devices capable of executing machine-readable program instructions and communicating with other computer devices via a network.

Management console 104 manages physical server 102, external physical host resource 106 and the components therein. Management console 104 provides both a graphical user interface (GUI) and application programming interfaces (API) for automated configuration management. Resource manager 110, residing in management console 104, allows for the management of activating and deactivating resources. Resource manager 110 can bundle resource activation steps for two or more resource consumers, where resource manager 110 can perform activation steps in parallel for the two or more resource consumers. Resource manager 110 can also execute activation and deactivation when reassigning host resources.

In this embodiment, hypervisor 114 provides execution environments for multiple virtual servers, such as virtual server 112A and virtual server 112B, to run on physical server 102. In addition to virtual server 112A and 112B, hypervisor 114 can host one or more additional hypervisors not illustrated in FIG. 1. Therefore, virtual server 112A, virtual server 112B, and hypervisor 114 can execute on one or more underlying levels of hypervisors. A server cluster can include one or more physical servers 102, therefore, virtual servers can execute on different nodes (i.e., physical servers) of the server cluster.

Virtual server 112A, virtual server 112B, and hypervisor 114 are resource consumers and each includes virtual resource definitions 122. Virtual resource definitions 122 can include, but are not limited to, processors, memory, and I/O ports. Virtual resources are supported by physical resources, which can exist internally or externally of physical server 102. Typically, external and internal host resources include virtual host resources. For example, virtual processors are based on physical processors and virtual network adapters are based on physical network adapters. Examples of providers for virtualization of host resources can include physical server 102 (hardware and firmware), hypervisor 114, or an independent virtualization entity not illustrated in FIG. 1. In this embodiment, internal physical host resource 116 and external physical host resource 106, respectively, include internal virtual host resources 118 and external virtual host resources 120. I/O network 124 can connect physical server 102 with external physical host resource 106.

In general, management network 108 can be any combination of connections and protocols that can support communications between physical server 102, management console 104, and external physical host resource 106. I/O network 124 can be any combination of connections and protocols that's can support communications between physical server 102 and external physical host resource 106. Typically, management network 108 and I/O network 124 are independent from one and other. Management network 108 and I/O network 124 can include, for example, a local area network (LAN), a wide area network (WAN), such as the internet, a cellular network, or any combination of the preceding, and can further include wired, wireless, and/or fiber optic connections.

Figure 2A:
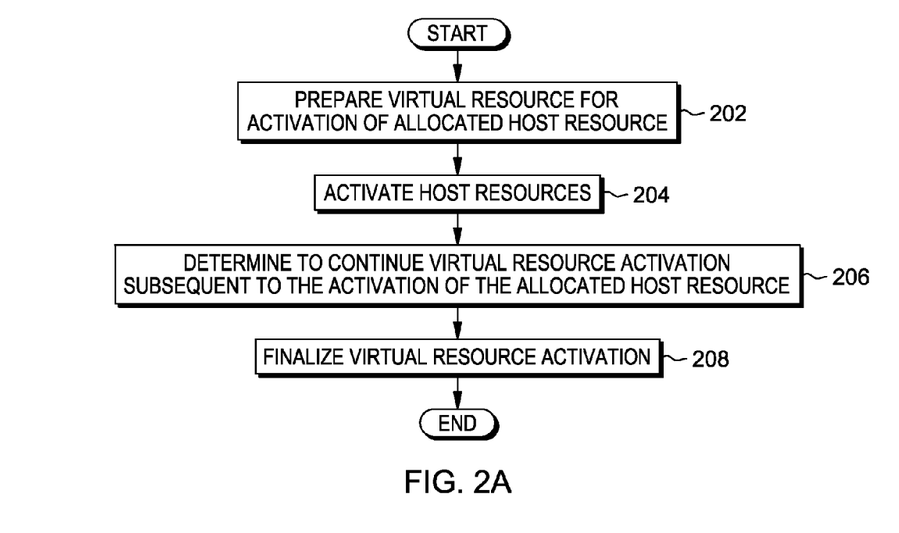
FIG. 2A is a flowchart depicting operational steps of a resource manager activating resources, in accordance with an embodiment of the present invention.

FIG. 2A is a flowchart depicting operational steps of a resource manager activating resources, in accordance with an embodiment of the present invention.

Resource allocation (allocation of host resources to virtual resources) and resource activation of both virtual resources and the assigned host resources is typically performed when a resource consumer owning the virtual resources is activated, and when resources are added to an active resource consumer. Resource de-allocation and resource deactivation of both virtual resources and the assigned host resources is typically performed when a resource consumer owning a virtual resource is deactivated, and when resources are removed from an active resource consumer. Typically, the allocation and de-allocation is a one-step operation. However, resource activation and deactivation can consist of multiple steps which affect both the virtual resources and the associated host resources, and depend on the operational state of the resource consumer.

Virtual resources typically exist as part of a resource consumer, more specifically as part of the definitions of the resource consumer. For each type of virtual resource, there is a virtual resource provider managing the virtual resource. For example, a network manager manages communication network ports, or a storage manager manages storage resources and storage network ports. Managing virtual resources includes the activating and deactivating of the virtual resources. Host resources are present when there are underlying physical resources present, and when the virtual entity providing appropriate virtualized host resources is present as well. Host resources can be organized in resource pools from which resource manager 110 can allocated each individual resource. For each type of host resource, there is a host resource provider that manages the host resource.

Resource manager 110 prepares a virtual resource for activation of allocated host resources (step 202). Resource manager 110 queries defined virtual resources and host resources, where resource manager 110 utilizes a resource consumer for the queries. Resource manager 110 determines availability of the host resources and allocates the host resources, where resource manager 110 utilizes resource consumer, virtual resource providers, and host resource pools for the determination and allocation. In this embodiment, resource manager 110 prepares internal virtual host resources 118 and external virtual host resources 120 for activation of allocated internal physical host resources 116, and external physical host resources 106, respectively. Resource manager 110 utilizes the resource consumer and virtual resource providers to prepare a virtual resource for activation of allocated host resources. Virtual resource definitions 122 dictate the preparation of internal virtual host resources 118 and external virtual host resources 120.

Resource manager 110 activates host resources (step 204). In this embodiment, resource manager 110 activates both external physical host resource 106 and internal physical host resource 116 according to the needs of the resource consumers. Resource manager 110 updates virtual resource definitions 122 to indicate that external physical host resource 106 and internal physical host resource 116 are activated. Resource manager 110 utilizes the resource consumer, virtual resource providers, host resource pools, and host resource providers to activate the host resources (i.e., external physical host resource 106 and internal physical host resource 116).

Resource manager 110 determines to continue virtual resource activation subsequent to the activation of the allocated host resources (step 206). In this embodiment, resource manager 110 performs the virtual resource activation for internal virtual host resources 118 and external virtual host resources 120. Resource manager 110 utilizes the resource consumer and the virtual resource providers to continue the activation of virtual resources.

Resource manager 110 finalizes virtual resource activations (step 208). In this embodiment, resource manager 110 performs a finalization of the activation of internal virtual host resources 118 and external virtual host resources 120. This finalization can include updating I/O configuration definitions of a particular virtual machine associated with the virtual resource. In this example, resource manager 110 updates I/O configuration definitions for virtual server 112A and virtual server 112B. Resource manager 110 utilizes the resource consumer and the virtual resource providers to finalize the activation subsequent to resource consumer activation.

Figure 2B:
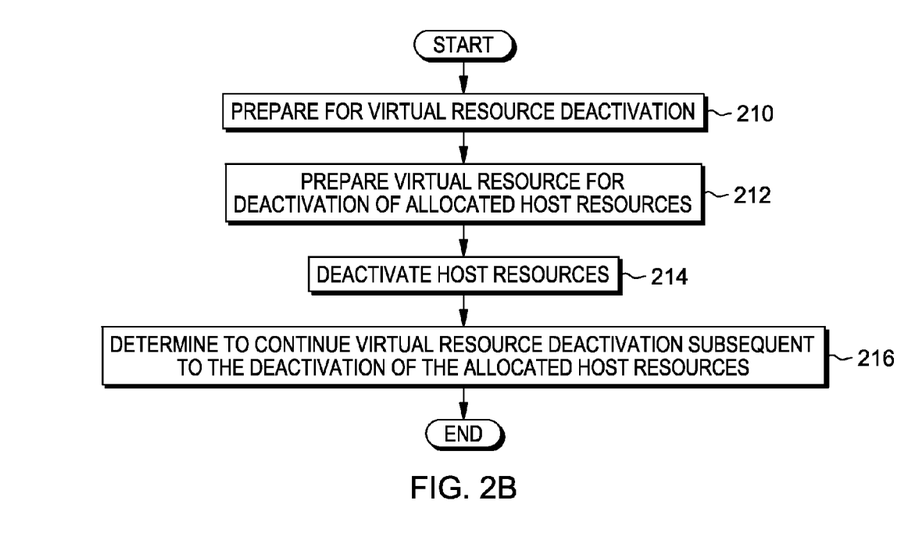
FIG. 2B is a flowchart depicting operational steps of a resource manager deactivating resources, in accordance with an embodiment of the present invention.

FIG. 2B is a flowchart depicting operational steps of a resource manager deactivating resources, in accordance with an embodiment of the present invention.

Resource manager 110 prepares virtual resource for deactivation (step 210). Resource manager 110 prepares for virtual resource deactivation while the resource consumer is still active. Resource manager 110 utilizes the resource consumer and virtual resource providers for the preparation of the virtual resource for deactivation.

Resource manager 110 prepares virtual resource for deactivation of allocated host resources (step 212). Subsequent to the deactivation of the virtual machines (i.e., virtual server 112A and virtual server 112B), resource manager 110 prepares internal virtual host resources 118 and external virtual host resources 120 for deactivation of allocated internal physical host resources 116, and external physical host resources 106, respectively. Virtual resource definitions 122 dictate the preparation of internal virtual host resources 118 and external virtual host resources 120. Resource manager 110 utilizes the resource consumer and virtual resource providers to prepare the virtual resources for deactivation of the associated host resources.

Resource manager 110 deactivates host resources (step 214). In this embodiment, resource manager 110 deactivates both external physical host resource 106 and internal physical host resource 116. Resource manager 110 updates virtual resource definitions 122 to indicate that external physical host resource 106 and internal physical host resource 116 are deactivated. Resource manager 110 utilizes the resource consumer, virtual resource providers, host resource pools, and host resource providers to deactivate the host resources.

Resource manager 110 determines to continue virtual resource deactivation subsequent to the deactivation of the allocated host resources (step 216). In this embodiment, resource manager 110 performs the virtual resource deactivation for internal virtual host resources 118 and external virtual host resources 120 subsequent to the deactivation of both external physical host resource 106 and internal physical host resource 116. Resource manager 110 utilizes the resource consumer and the virtual providers to finalize virtual resource deactivation and de-allocate the host resources.

Figure 3:
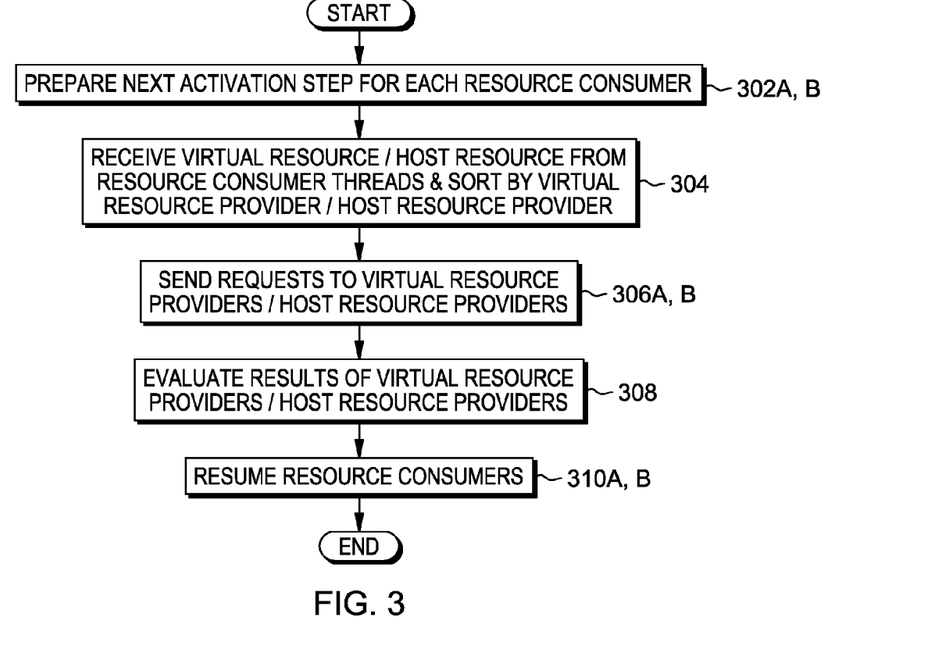
FIG. 3 is a flowchart depicting operational steps of a resource manager bundling resource activation steps for resource consumers, in accordance with one embodiment of the present invention.

FIG. 3 is a flowchart depicting operational steps of a resource manager bundling resource activation steps for resource consumers, in accordance with one embodiment of the present invention.

Typically, for each resource consumer there are multiple virtual resources defined, where some of the virtual resources are of the same type. Accordingly, the virtual resources of a resource consumer need multiple host resources, where some of the host resources are of the same type. Resource manager 110 has the ability to combine resource activations for virtual resources and host resources of the same type. For example, virtual resources of the same type are sent to the responsible virtual resource provider in a single request rather than individual requests for each virtual resource. Similarly, host resources of the same type are sent to the responsible host resource provider in a single request rather than individual requests for each host resource. To enable parallel execution of virtual resource and host resource activations by different virtual resource providers and host resource providers, resource manager 110 utilizes a separate execution thread for each virtual resource provider and host resource provider.

FIG. 3 represents two threads managing the activation of 2 resource consumers, where resource manager 110 independently and in parallel performs steps 302, 304, 308, and 310. For example, resource manager 110 performs step 302A independently and in parallel to step 302B. However, resource manager 110 suspends the two threads during step 306. Resource manager 110 performs step 306A in parallel with step 306B in multiple independent virtual resource provider or host resource provider threads, where there is one thread per each virtual resource provider or host resource provider which manages virtual resources or host resources. Upon completion of the virtual resource provider and host resource provider threads, resource manager 110 resumes the two resource consumer threads (i.e., step 310A and step 310B).

Resource manager 110 prepares next activation step for resource consumer #1 and #2 (step 302A, 302B). In this embodiment, resource manager 110 prepares the next activation step for resource consumer #1 of the first thread in parallel to the preparation of the next step for resource consumer #2 of the second thread. Resource manager 110 idles while waiting for the two pending resource consumer threads to arrive, subsequent to the completion of the preparation for each resource consumer thread or for any of the resource consumer threads to timeout. Resource manager 110 suspends all active resource consumer threads except one resource consumer thread.

Resource manager 110 receives virtual resources/host resources from resource consumer threads and sorts them by virtual resource provider/host resource provider (step 304). In this embodiment, resource manager 110, operating on one thread, receives virtual resources and host resources from the first consumer thread and the second consumer thread. Resource manager 110 sorts the virtual resources and the host resources according to virtual resource providers and host resource providers. Resource manager 110 sorts the virtual resources according to associated virtual resource providers and sorts the host resources according to associated host resource providers.

Resource manager 110 sends requests to virtual resource providers/host resource providers (step 306A, 306B). In this embodiment, resource manager 110 sends a single request to each virtual resource provider or host resource provider rather than multiple requests to each virtual resource provider or host resource provider. For example, in step 306A resource manager 110 sends a request to a first virtual resource provider or host resource provider and in step 306B resource manager sends a request to a second virtual resource provider or host resource provider. In this embodiment, resource manager 110 performs step 306A and 306B independently but in parallel utilizing an additional thread for the second virtual resource provider or host resource provider.

Resource manager 110 evaluates results of virtual resource providers/host resource providers (step 308). In this embodiment, resource manager 110 idles while waiting for the completion of the first virtual resource provider or host resource provider and the second virtual resource provider or host resource provider threads. Subsequent to the completion of the first virtual resource provider or host resource provider and the second virtual resource provider or host resource provider threads, resource manager 110 evaluates the results. Based on the evaluation, resource manager 110 can determine whether or not to perform a rollback on any one of the two virtual resource provider or host resource provider threads.

Resource manager 110 resumes resource consumers (step 310A, 310B). For the resource consumer in the first thread of step 302A and the second thread of step 302B, resource manager 110 determines to resume the first resource consumer thread and the second resource consumer thread. The resulting continuation of the first resource consumer thread is independently parallel with the second resource consumer thread.

Figure 4A:
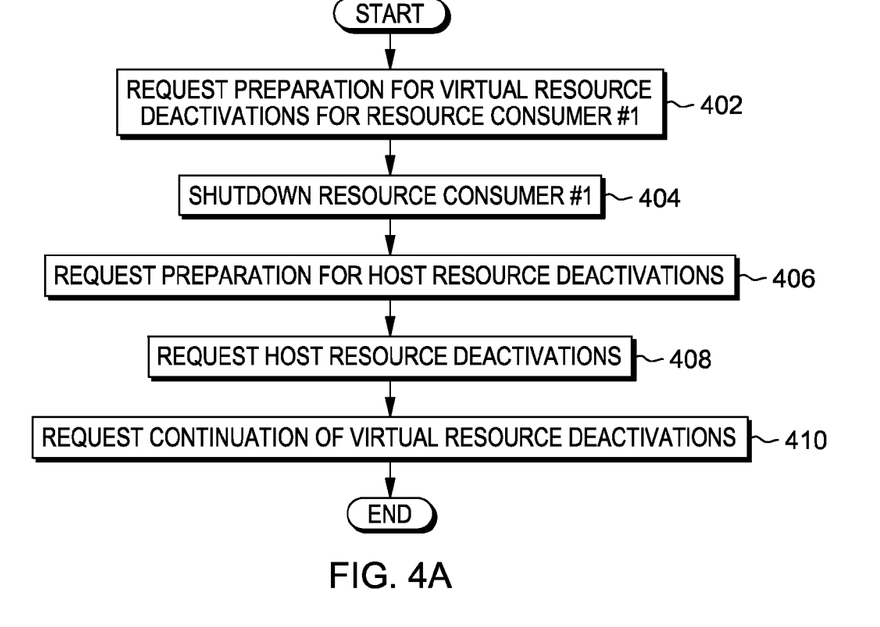
FIG. 4A is a flowchart depicting operational steps of a resource manager's concurrent execution of resource activation and deactivation when reassigning host resources from the perspective of the deactivation, in accordance with one embodiment of the present invention.

FIG. 4A is a flowchart depicting operational steps of a resource manager's concurrent execution of resource activation and deactivation when reassigning host resources from the perspective of the deactivation, in accordance with one embodiment of the present invention.

Figure 4B:
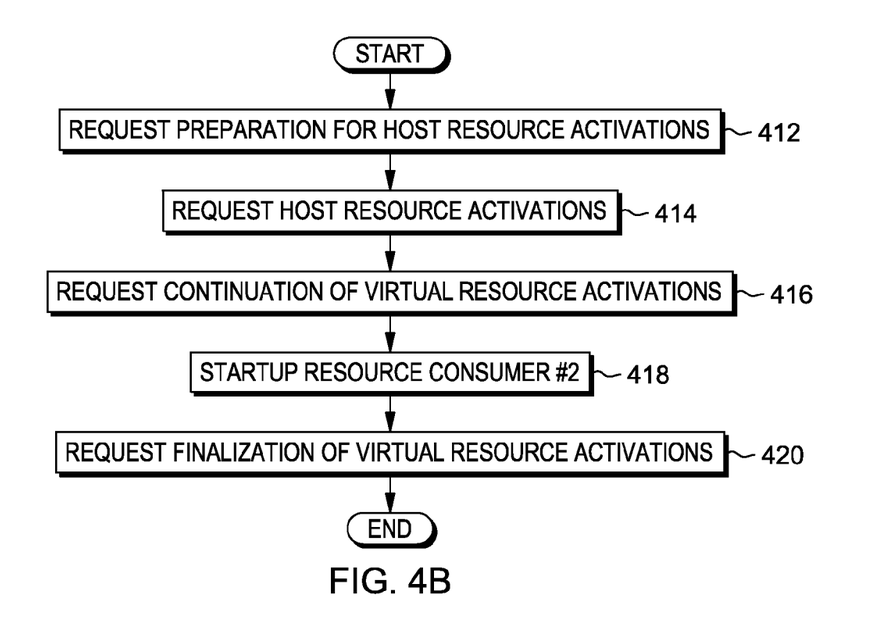
FIG. 4B is a flowchart depicting operational steps of a resource manager's concurrent execution of resource activation and deactivation when reassigning host resources from the perspective of the activation, in accordance with one embodiment of the present invention.

FIG. 4A and FIG. 4B represent resource-related action in the context of activating or deactivating a resource consumer. FIG. 4A and FIG. 4B represent two threads which resource manager 110 performs in parallel. FIG. 4A represents an activation thread of first resource consumer and FIG. 4B represents a deactivation thread of a second resource consumer. Subsequent to the completion of steps (i.e., step 402/412, 404/414 etc.), resource manager 110 halts the two threads and parallel execution of virtual resource providers and host resource providers occurs. Upon completion, the two threads of the resource consumers are resumed.

Typically, resource manager 110 does not perform further resource related activities when adding or removing virtual resource definitions to or from an inactive resource consumer. In the event there are additions to the virtual resource definition to an active resource consumer, resource manager 110 implements the additions to the virtual resource definitions to use a resource. Resource manager 110 performs both the allocation of appropriate host resources and the multi-step activation of the resource. The number of steps to activate the added resource is similar to the number of steps to activate the resource in the context of a resource consumer activation, where the difference is that resource manager 110 does not activate the resource consumer. In the event there is a removal of virtual resource definition from an active resource consumer, resource manager 110 deactivates and de-allocates the resource. Resource manager 110 can activate and allocate the resource for another resource consumer, therefore resource manager 110 performs a multi-step deactivation of the resource and the de-allocation of associated host resources. The number of steps to deactivate the resource to be removed is similar to the number of steps to deactivate a resource in the context of a the resource consumer deactivation, where the difference is that resource manager 110 does not deactivate the resource consumer.

Resource manager 110 request preparation for virtual resource deactivations for resource consumer #1 (step 402). In this embodiment, resource manager 110 determines virtual resource definitions are removed for resource consumer #1. Resource manager 110 can send a request to a virtual resource provider, where the virtual resource provider prepares for the deactivation of the virtual resources of resource consumer #1.

Resource manager 110 shuts down resource consumer #1 (step 404). In this embodiment, resource manager 110 shuts down resource consumer #1, where shutting down resource consumer #1 also includes subsequent steps of deactivating host resources for resource consumer #1.

Resource manager 110 requests preparation for host resource deactivations (step 406). In this embodiment, resource manager 110 sends a request to the virtual resource provider to prepare the host resources of resource consumer #1 for deactivations. The virtual resource provider prepares for the deactivation of the host resources for resource consumer #1. Resource manager 110 can bundle preparations for deactivation and activation of host resources of multiple resource consumers (i.e., resource consumer #1 and resource consumer #2) for a single virtual resource provider, where the single virtual resource provider performs preparations for deactivation and activation of host resources of multiple resource consumers concurrently.

Resource manager 110 requests host resource deactivations (step 408). In this embodiment, resource manager 110 sends a request to the host resource provider to deactivate host resources for resource consumer #1. The host resource provider deactivates the host resources for resource consumer #1. Resource manager 110 can bundle the deactivation and activation of host resources of multiple resource consumers (i.e., resource consumer #1 and resource consumer #2) for a single host resource provider, where the single host resource provider performs deactivation and activation of host resources of multiple resource consumers concurrently.

Resource manager 110 requests continuation of virtual resource deactivations (step 410). In this embodiment, resource manager 110 sends a request to the virtual resource provider for continuation of deactivation of virtual resources of resource consumer #1. The virtual resource provider continues with the deactivation of the virtual resources for resource consumer #1. Resource manager 110 can bundle the continuation of deactivation and activation of virtual resources of multiple resource consumers (i.e., resource consumer #1 and resource consumer #2) for a single host resource provider, where the single host resource provider performs continuations of deactivation and activation of virtual resources of multiple resource consumers concurrently.

FIG. 4B is a flowchart depicting operational steps of a resource manager's concurrent execution of resource activation and deactivation when reassigning host resources from the perspective of the activation, in accordance with one embodiment of the present invention.

Resource manager 110 requests preparation for host resource activations (step 412). In this embodiment, resource manager 110 sends a request to the virtual resource provider to prepare the host resources of resource consumer #2 for activations. The virtual resource provider prepares for the activation of the host resources for resource consumer #2. As previously mentioned in the discussion of FIG. 4A, resource manager 110 can bundle preparations for deactivation and activation of host resources of multiple resource consumers (i.e., resource consumer #1 and resource consumer #2) for a single virtual resource provider, where the single virtual resource provider performs preparations for deactivation and activation of host resources of multiple resource consumers concurrently.

Resource manager 110 request host resource activations (step 414). In this embodiment, resource manager 110 sends a request to the host resource provider to activate host resources for resource consumer #2. The host resource provider activates the host resources for resource consumer #2. As previously mentioned in the discussion of FIG. 4A, resource manager 110 can bundle the deactivation and activation of host resources of multiple resource consumers (i.e., resource consumer #1 and resource consumer #2) for a single host resource provider, where the single host resource provider performs deactivation and activation of host resources of multiple resource consumers concurrently.

Resource manager 110 requests continuation of virtual resource activations (step 416). In this embodiment, resource manager 110 sends a request to the virtual resource provider for continuation of activation of virtual resources of resource consumer #2. The virtual resource provider continues with the activation of the virtual resources for resource consumer #2. As previously mentioned in the discussion of FIG. 4A, resource manager 110 can bundle the continuation of deactivation and activation of virtual resources of multiple resource consumers (i.e., resource consumer #1 and resource consumer #2) for a single virtual resource provider, where the single virtual resource provider performs continuations of deactivation and activation of virtual resources of multiple resource consumers concurrently.

Resource manager 110 starts up resource consumer #2 (step 418). In this embodiment, resource manager 110 starts up resource consumer #2, where starting up resource consumer #2 also includes subsequent steps of activating virtual resources for resource consumer #2.

Resource manager 110 requests finalization of virtual resource activations (step 420). In this embodiment, resource manager 110 can send a request to the virtual resource provider, where the virtual resource provider finalizes the activation of the virtual resources of resource consumer #2. Finalization of the virtual resource activation allows for resource consumer #2 to utilize the activated resources.

Figure 5:
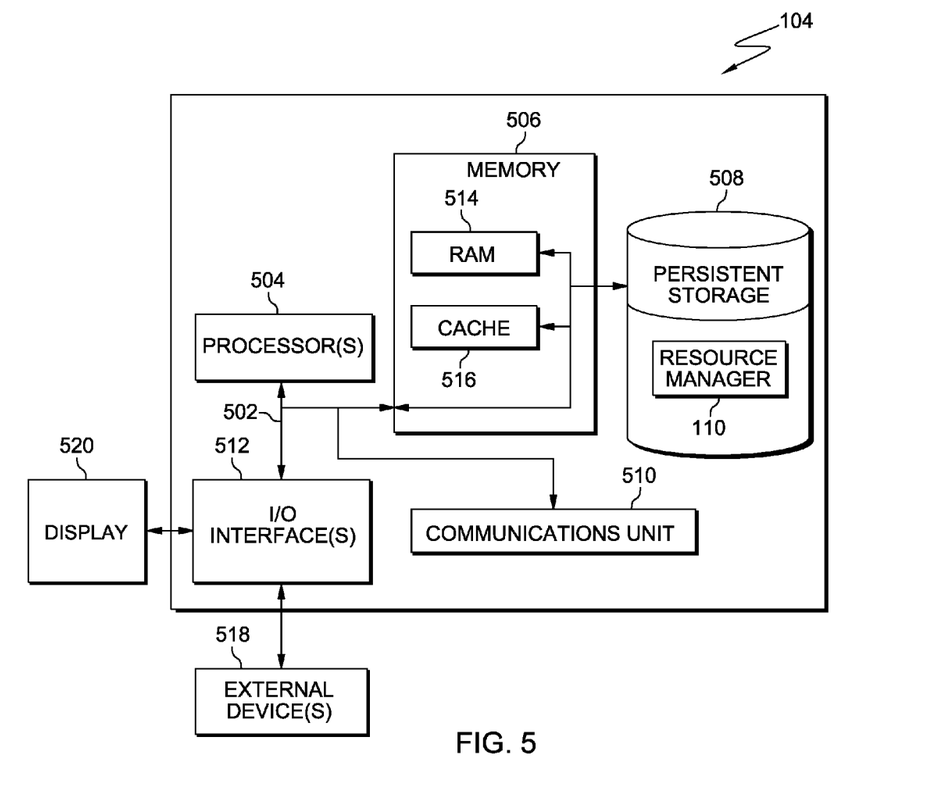
FIG. 5 is a block diagram of components of a computer system, such as the computer server of FIG. 1, in accordance with an embodiment of the present invention.

FIG. 5 depicts a block diagram of components of a computer, such as management console 104, hosting resource manager 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Management console 104 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage device.

Resource manager 110 is stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by management console 104. In these examples, communications unit 510 includes one or more wireless network interface cards. Communications unit 510 may provide communications through the use of either or both physical and wireless communications links. Computer programs and processes, such as resource manager 110, may be downloaded to persistent storage 508 through communications unit 510, or uploaded to another system through communications unit 510.

I/O interface(s) 512 allows for input and output of data with other devices that may be connected to management console 104. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520. Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing resources in a server environment, the method comprising:

querying, by one or more processors, a first resource consumer for a list, wherein the list includes at least a first virtual resource and a first host resource;

querying, by one or more processors, a host resource pool to determine if the first host resource is present;

responsive to determining the first host resource is present in the host resource pool, allocating, by one or more processors, the first host resource to the first resource consumer;

sending, by one or more processors, a request to activate the first virtual resource and the first host resource to a virtual resource provider and a host resource provider, wherein the request to activate the first virtual resource and the first host resource is performed on a single thread;

determining, by one or more processors, to prepare one or more virtual resources for activation of one or more allocated host resources based at least in part on virtual resource definitions;

activating, by one or more processors, the one or more allocated host resources;

updating, by one or more processors, the virtual resource definitions to indicate the one or more allocated host resources are activated;

activating, by one or more processors, the one or more virtual resources;

determining, by one or more processors, the first resource consumer is initialized;

sending, by one or more processors, a request to finalize the activation of the first virtual resource; and finalizing, by one or more processors, the activation of the one or more virtual resources, wherein finalizing the activation includes updating the I/O configuration definitions for each of the one or more virtual resources.

2. The method of claim 1, further comprising:

determining, by one or more processors, to prepare the one or more virtual resources for deactivation of the one or more allocated host resources based at least in part on the virtual resource definitions;

deactivating, by one or more processors, the one or more allocated host resources;

deactivating, by one or more processors, the one or more virtual resources; and finalizing, by one or more processors, the deactivation of the one or more virtual resources, wherein finalizing the deactivation includes updating the virtual resource definitions.

3. The method of claim 1, further comprising:

determining, by one or more processors, to prepare the first virtual resource of the virtual resource provider for deactivation, wherein the determination is based at least in part on the virtual resource definitions;
determining, by one or more processors, to prepare the first host resource of the host resource provider for deactivation; and
assigning, by one or more processors, the first host resource to a second virtual resource for a second resource consumer.

4. The method of claim 3, further comprising:
activating, by one or more processors, the second virtual resource; and
activating, by one or more processors, the second resource consumer.

\* \* \* \* \*